United States Patent [19]
Raskin et al.

[11] Patent Number: 5,393,426
[45] Date of Patent: Feb. 28, 1995

[54] METHOD FOR REMOVING SOLUBLE METALS FROM AN AQUEOUS PHASE

[75] Inventors: Ilya Raskin, Manalapan; Slavik Douchenkov, East Brunswick, both of N.J.; Yoram Kapulnik, Ness Ziona, Israel; Nanda P. B. A. Kumar, New Brunswick, N.J.

[73] Assignee: PhytoTech, Inc., Morristown, N.J.
[21] Appl. No.: 72,493
[22] Filed: Jun. 4, 1993
[51] Int. Cl.$^6$ .................................................. C02F 3/32
[52] U.S. Cl. .................................. 210/602; 210/747; 210/912; 210/913; 210/914; 47/58
[58] Field of Search ............... 210/602, 747, 170, 912, 210/913, 914; 47/58, 58.06

[56] References Cited

U.S. PATENT DOCUMENTS

| | | | |
|---|---|---|---|
| 3,728,254 | 4/1973 | Carothers | 71/9 |
| 4,310,990 | 1/1982 | Payne | 47/59 |
| 4,333,837 | 6/1982 | Plosz et al. | 210/602 |
| 4,732,681 | 3/1988 | Galun et al. | 210/611 |
| 4,839,051 | 6/1989 | Higa | 210/602 |
| 4,872,985 | 10/1989 | Dinges | 210/602 |
| 4,904,386 | 2/1990 | Kickuth | 210/602 |
| 4,995,969 | 2/1991 | LaVigne | 210/602 |
| 5,000,852 | 3/1991 | Tel-Or et al. | 210/602 |
| 5,100,455 | 3/1992 | Pinckard et al. | 210/690 |
| 5,106,504 | 4/1992 | Murray | 210/602 |
| 5,121,708 | 6/1992 | Nuttle | 47/1.4 |
| 5,269,094 | 12/1993 | Wolverton et al. | 210/602 |
| 5,320,663 | 6/1994 | Cunningham | 210/602 |

FOREIGN PATENT DOCUMENTS

| | | |
|---|---|---|
| 277905 | 4/1990 | Germany . |
| 647997 | 1/1989 | Japan . |
| 916438 | 4/1982 | U.S.S.R. . |
| 1411295 | 7/1988 | U.S.S.R. . |

OTHER PUBLICATIONS

B. C. Wolverton, "Aquatic Plants for Wastewater Treatment: An Overview", 1987, *Aquatic Plants for Water Treatment and Resource Recovery*, Magnolia Publishing, Inc., pp. 3–15.

S. Z. Haider, et al., "Mechanism of Absorption of Chemical Species From Aqueous Medium by Water Hyacinth and Prospects of its Utilization", 1984, *United Nations Environment Programme—Nairobi; Proceedings of the International Conference on Water Hyacinth*, Hyderabad, India, Feb. 7–11, 1983, pp. 41–57.

F. Chigbo, et al., "Uptake of Arsenic, Cadmium, Lead and Mercury From Polluted Waters by the Water Hyacinth *Eichornia Crassipes*", 1982, *Environ. Pollution*, (Series A), pp. 31–36.

S. Muramoto, et al., "Removal of Some Heavy Metals from Polluted Water by Water Hyacinth (*Eichornia Crassipes*)", 1983, *Bull. Environm. Contam. Toxicol.*, vol. 30, pp. 170–177.

Kaiser Jamil et al., "Biotransfer of Metals to the Insect *Neochetina eichhornae* via Aquatic Plants", Arch. Environ. Contam. Toxicol. 22. 459–463, 1992.

S. Z. Haider et al., "Pollution Control . . . ", United Nations Environment Programme, 1984, pp. 627–634.

Terrence A. Lee et al., "Copper Uptake by the Water Hyacinth", J. Environ. Sci. Health, A22(2), 141–160(1987).

Truman D. Turnquist, "Nickel Uptake by the Water Hyacinth", J. Environ. Sci. Health, A25(8), 897–912(1990).

Stratford H. Kay et al., "Effects of Heavy Metals on Water Hyacinths (*Eichornia Crassipes* (Mart.) Solms)", Aquatic Toxicology, 5, 117–128, 1984.

Christine Heaton et al., "Lead Uptake by *Eichhornia Crassipes*", Toxicological and Environmental Chemistry, 1986, vol. 11, pp. 125–135, 1986.

F. E. Dierberg et al., "Removal of Copper and Lead Using a Thin–Film Technique", pp. 497–504., Aquatic Plants for Water Treatment and Resource Recovery (1987), Magnolia Publishing, Reddy and Smith (eds).

*Primary Examiner*—Christopher Upton
*Attorney, Agent, or Firm*—Choate, Hall & Stewart

[57] ABSTRACT

A process for the removal of metal ions from solution and means for effecting such removal are described. The process is based on the hydroponic growth of sunflowers, terrestrial turfgrasses and/or members of the family Brassicaceae in solutions containing one or more metal ions. Metal ions can be efficiently removed from solutions by passing these solutions through the root biomass of these terrestrial plants. Columns containing the root biomass are also part of the invention.

33 Claims, 5 Drawing Sheets

METHOD FOR REMOVING SOLUBLE METALS FROM AN AQUEOUS PHASE

This invention was made with government support under Grant No. R818619-01-0 awarded by the Environmental Protection Agency to Rutgers, the State University of New Jersey. The government has certain rights in the invention.

BACKGROUND OF THE INVENTION

Deposition of metal-rich mine tailings, metal smelting, leather tanning, electroplating, emissions from gas exhausts, energy and fuel production, downwash from powerlines, intensive agriculture and sludge dumping are the most important human activities which contaminate aqueous systems with large mounts of toxic metals. The list of sites contaminated with toxic metals grows larger every year, presenting a serious health problem and a formidable danger to the environment. Although water treatment procedures have been developed to remove metals from aqueous environments, water treatment plants, for example, do a relatively poor job of removing toxic metals from residential and industrial aqueous waste, contributing to the overall problem.

SUMMARY OF THE INVENTION

The present invention is a method for reducing an amount of metal in a metal-containing solution utilizing plant roots to absorb, concentrate and precipitate metal from the aqueous solution.

The method includes contacting the solution with a root biomass of a terrestrial plant under conditions sufficient for the root biomass to remove the metal from the solution, and then separating the root biomass from the solution. In preferred methods of the invention, a terrestrial plant is grown hydroponically in the presence of the soluble metal and the roots, either excised or still attached to the plants, are allowed to remain in contact with the solution containing the metal for a time sufficient for the roots to accumulate the metal and/or for the roots to initiate precipitation of the metal from solution (i.e. to convert the metal from a soluble form to an insoluble form). The roots are then harvested and/or the precipitated metal is separated from the solution.

Preferably, a hydroponic treatment bed is provided for holding a solution, the bed having one and another ends. A solution containing a soluble metal is introduced into one of the ends and allowed to contact the roots of the terrestrial plant that is maintained hydroponically within the bed. The plants will accumulate the metal in the roots and/or will initiate precipitation of the metal out of the solution. The solution is then removed from the hydroponic treatment bed. The flow of solution through the hydroponic treatment bed can either be continuous or can be intermittent in which the flow stops for a period of time to allow the roots to accumulate the metal from solution and/or precipitate the metal from solution. The solution is then removed from the hydroponic treatment bed and the process is repeated. Alternately, a column filled with excised roots can be used to achieve similar results. The method further includes harvesting the roots after allowing accumulation and/or precipitation of the metal.

The metals that are capable of being accumulated and precipitated by the plants are any one of a variety of heavy metals or radioactive metals selected from the following elements: lead, chromium, mercury, cadmium, cobalt, nickel, molybdenum, copper, arsenic, selenium, zinc, antimony, beryllium, gold, barium, manganese, silver, thallium, tin, rubidium, strontium, vanadium, yttrium, technecium, ruthenium, palladium, indium, cesium, uranium, plutonium, and cerium.

The preferred terrestrial plants used in the method of the invention are the sunflower plant (*Helianthus annuus* L.) and plants selected from the tuffgrasses and members of the family Brassicaceae. The most preferred plants are Helianthus and members of the Brassiceae tribe including *Brassica juncea* and others.

The invention also is a system for reducing an amount of metal in a metal-containing solution. The system includes a means for holding a metal-containing solution; a root portion of a terrestrial plant in contact with the solution; and a means for moving the solution within the holding means. Preferably, the holding means is a column having opposed ends and the moving means is a pump in fluid communication with at least one end of the column. The preferred terrestrial plants are sunflowers, tuffgrasses and members of the Brassicaceae, all of which can accumulate soluble metal within their roots and/or precipitate the soluble metal out of solution.

DETAILED DESCRIPTION OF THE INVENTION

Figure 1:
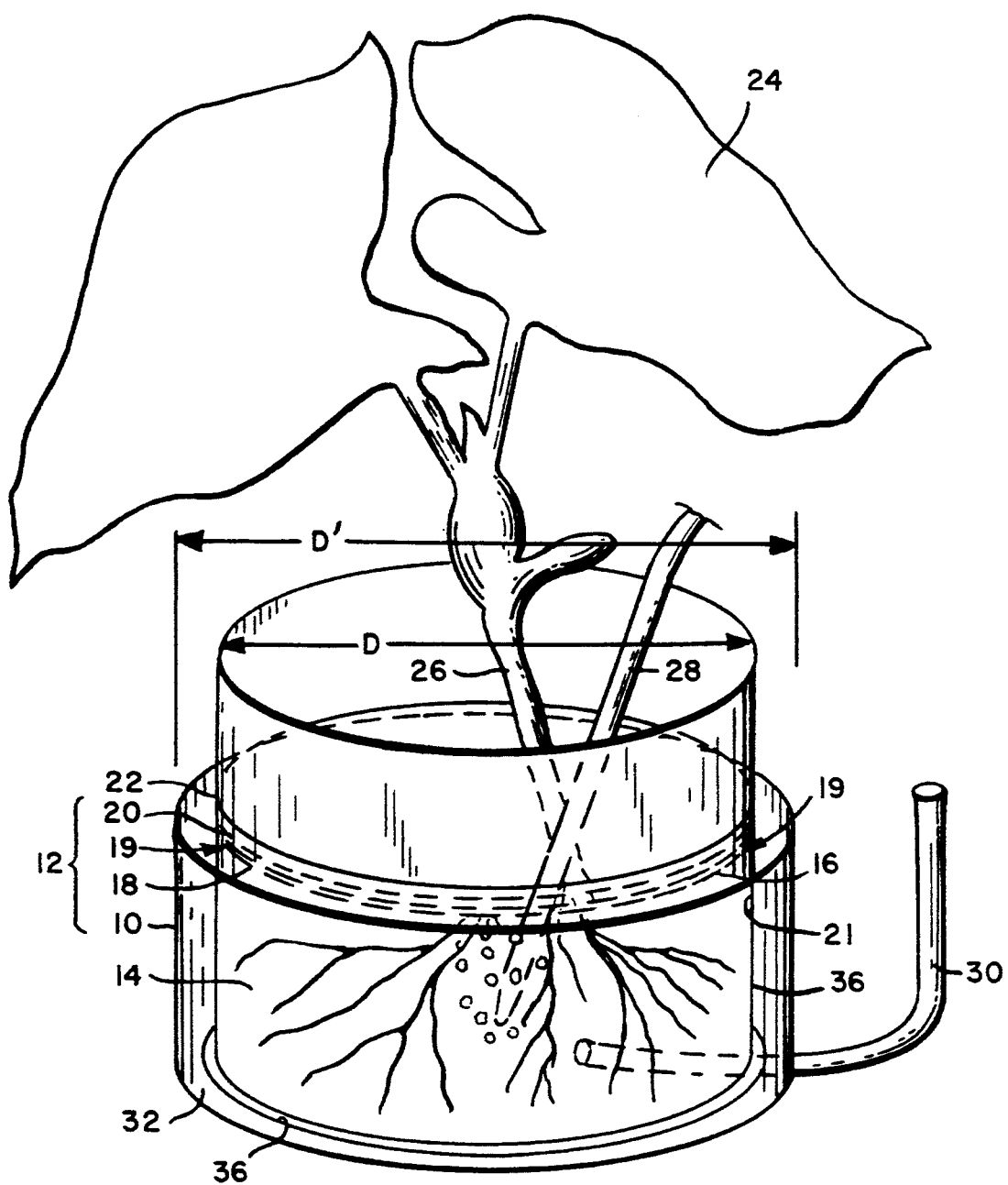
FIG. 1 is a schematic, perspective view of a hydroponic column of the present invention.

This invention is based in part, on exploitation of the ability of certain plants to concentrate metals from solution. This concentration can occur by one, or both of the following mechanisms:

(a) Soluble metals can be accumulated by the plant and transferred into plant biomass, in particular, the root and/or shoot biomass. Preferred methods of the present invention utilize plants that will preferably accumulate metals in the root biomass.

(b) Certain plants can precipitate soluble metal out of a metal-containing solution. This phenomenon is documented for the first time as part of this invention and is believed caused by exudation of inorganic and organic materials from the roots that can act as, for example, chelators to precipitate soluble metals out of solution. That is, in a chemical engineering sense, roots can act as both ion exchange resins and as chemical precipitators.

The present method for reducing an amount of metal in a metal-containing solution is used to remove primarily metal ions from the solution by either allowing for uptake of the metal ions into the plant biomass or by conversion of the soluble metal ions into an insoluble form. The term "soluble metal ions" means metal cations or metal-containing anionic species. Soluble metal ions may be present, either alone or bound with anions or chelating agents, that are soluble in the solution at environmentally relevant temperatures (e.g. greater than 0 degrees C. to less than about 45 degrees C.). The term "insoluble" refers to metal ions that are substantially insoluble in the solution at environmentally relevant temperatures. The term "insoluble" is also intended to include non-ionic, elemental forms of the metal.

The method is used for the removal of metals that are selected from the commonly known heavy metals and radioactive metals such as, for example, lead, chromium, mercury, cadmium, cobalt, nickel, molybdenum, copper, arsenic, selenium, zinc, antimony, beryllium, gold, barium, manganese, silver, thallium, tin, rubidium, strontium, vanadium, yttrium, technecium, ruthenium, palladium, indium, cesium, uranium, plutonium, and cerium. The term "metal" is also meant to include mixtures of metals and common organic pollutants, for example, lead or chromium in combination with nitrophenol, benzene and/or alkylbenzyl sulfonates (detergents). The method may also be capable of removing more than one metal from an aqueous solution. Literature reports suggest that certain plants may concentrate several different metals in their roots, implying that the mechanism of metal uptake is not always metal-specific.

The term "solution" refers to any metal contaminated liquid such as industrial and residential waste streams, water treatment-plant effluents, ground and surface water, diluted sludge and other aqueous streams containing radioactive and nonradioactive metals.

The plants used in the preferred methods are terrestrial plants. The term "terrestrial" refers to photosynthetic plants that normally grow in soils or sediments. The soils or sediments can include a variety of soil types having wide ranges of water content and organic matter content. The terrestrial plants can therefore include crop-related plants and/or plants associated with environments such as wetlands. The term is also meant to include portions of terrestrial plants (i.e. excised shoots and/or roots). The term "terrestrial" is not, however, meant to refer to strictly aquatic plants that spend their entire life cycle completely floating on, or submerged in, an aqueous solution. These aquatic plants also include floating ferns, (e.g., Azolla), duckweed (Lemna), and water hyacinth (Eichhornia). Moreover, the term "terrestrial" is not intended to include isolated plant cells or cell suspensions capable of metal uptake.

Although the hydroponically-grown terrestrial plants selected for use in the present method can also accumulate metals in their shoot portions (i.e., those portions above the aqueous solution), it is preferred that the terrestrial plants used in the present method do not accumulate significant mounts of metal in their shoots. This is because shoots that do not accumulate metals may be discarded with no special precautions or may be allowed to regenerate new roots. Perennial grasses offer specific advantages in this regard. Their roots can be continuously harvested and new roots will grow from the remaining shoots. Once the new roots are grown, the hydroponic metal uptake methods are repeated.

Preferred terrestrial plants are therefore those having roots that absorb and precipitate metals and can be harvested in bulk in the shortest practical period of time.

The terrestrial plants most suitable for the present invention are a variety of turfgrasses and members of the family Brassicaceae as well as the common sunflower, *Helianthus annuus* L. Exemplary turf grasses include Colonial bentgrass, Kentucky bluegrass, perennial ryegrass, creeping bentgrass, a variety of fescues and lovegrasses, Bermudagrass, Buffalograss, centipedegrass, switch grass, Japanese lawngrass and coastal panicgrass. Members of the Brassicaceae include *Brassica juncea* and *B. oleracea*. Other plants also suitable for the present method include spinach, sorghum, tobacco, and corn.

The terrestrial plants may also include those plants that are selectively bred and/or genetically engineered for an enhanced ability to accumulate metals in a hydroponic environment.

A preferred procedure is to grow selected plants from seeds (i.e. Brassica or Helianthus) or grass sod (e.g. turfgrasses) in a hydroponic environment with roots immersed in a nutrient solution. After a period of time, the nutrient solution is replaced with a metal-ion containing solution. Metal accumulating in the plant tissue is measured by, for example, atomic absorption spectrometry or plasma spectrometry. Metals are extracted with strong acids according to established protocols. See Blincoe et al., *Comm. Soil. Plant Anal.*, 18: 687 (1987); Baker and Suhr, "Atomic Absorption Spectrometry", pp. 13–27 in *Methods Of Soil Analysis*, part 2, Am. Soc. Agron., Madison, Wis., (1982). Metal remaining in the solution is measured by, for example, atomic absorption or plasma spectrometry. See, Soltanpour et al., "Optical emission spectrometry", pp. 29-65 in *Methods of Soil Analysis*, part 2, Am. Soc. Agron., Madison, Wis., (1982). The difference between the decrease in metal in solution and metal concentration in the plant is the amount of metal precipitated out of the solution (see Example 1). Plants exhibiting the best metal uptake and/or precipitation properties may be further tested by obtaining seeds from various germ plasm collecting centers and laboratories. The cultures grown from these seeds are re-tested with the screening assay described above. It will be appreciated that this screening assay can be performed on plants other than those members described herein and using metals other than those specified herein.

Alternatively, or in addition, the plants may be mutagenized using well-known chemical mutagens. For example, ethylmethylsulfonate (EMS) is a potent mutagen which increases genetic variability by increasing the frequency of genomic mutations. See, for example, Redei, G. P. "Genetic Manipulations of Higher Plants", L. Ledoux (ed), Plenum Press, N.Y., (1975). Ethylmethylsulfonate has been used in selection programs to produce heritable changes in plant biochemistry and physiology, particularly in *Arabidopsis thaliana*, a member of the Brassicaceae.

The hydroponic screening system described above is used to identify terrestrial plant species with the highest metal accumulating and precipitating potential. The seeds of these lines are then subjected to EMS mutagenesis using, for example, the methods of Estell et at, "The mutants of Arabidopsis", p. 89 in *Trends in Genetics*, Elsevier Science Publishers, B. V., Amsterdam, 1986.

Briefly, mutagenesis is accomplished by soaking seeds in EMS solution to induce heterozygous mutations in those cells which will produce the reproductive structures. The M1 generation of plants is allowed to self-fertilize and at least 50,000 seedlings of the M2 progeny are screened for metal tolerance in artificial aqueous solutions containing various metal concentrations. The most tolerant M2 plants, those growing most vigorously, are analyzed for accumulation of metals; see Example 2.

Furthermore, the terrestrial plants used in the hydroponic methods of the present invention can be genetically manipulated using well-established techniques for gene transfer. It is well-known that a variety of non-photosynthetic organisms respond to metals by production of metallothioneins (MT's), low molecular weight proteins encoded by structural genes. See, for example Maroni, G., "Animal Metallothioneins", pp. 215–232 in *Heavy Metal Tolerance in Plants; Evolutionary Aspects*, (ed. A. J. Shaw), CRC Press Inc., Florida (1990). The present invention contemplates increasing root uptake of metals by heterologous expression of MT's in transgenic plants.

A mammalian MT cDNA (e.g. monkey) can be obtained commercially or from an established source and a restriction enzyme fragment cloned into, for example, an Agrobacterium-based plant transformation/expression vector such as pJB90, a derivative of pGSFR780A. See, DeBlock et at., *Physiol Plant.*, 91: 694–701 (1989).

Seedling segments of terrestrial plants used in the present method are then incubated in the presence of a suspension of bacterial cells (e.g. *Agrobacterium tumefaciens*) carrying the expression vector. After several days, the regenerating seedling segments are transferred to the appropriate selection medium and further incubated. This results in transformants containing the mammalian MT gene (see Example 6).

The transformants are analyzed for the presence of MT DNA by Southern and Northern hybridization using mammalian MT as the probe. The transformants are also analyzed for expression of MT protein by immunoblot analysis with antisera against mammalian MT. See established protocols of, for example, Sambrook et al., Molecular Cloning: A Laboratory Manual, Cold Spring Harbor Laboratory Press, N.Y. (1989).

The method for reducing the amount of metal in a metal-containing solution includes contacting the aqueous solution with a root biomass of a terrestrial plant under conditions sufficient for the root biomass to convert the metal from a soluble form to an insoluble form. As discussed above, metal-ion removal can be easily determined by measuring the concentration of metal in the solution and in the plant biomass using a variety of well-known and well-characterized metal detection assays.

The methods of the invention rely on growth of terrestrial plants in a hydroponic system so that the root biomass will have maximum contact with the solution. The term "hydroponic" has a well-recognized meaning to those of ordinary skill in the art and generally refers to the science of growing plants in solutions containing necessary growth promoting materials, instead of in soil. The exact method of growing the plants hydroponically is not intended to limit the scope of the invention.

For example, the methods can include several hydroponic systems currently available. One system is a hydroponic method in which plants are grown in a receptacle for holding aerated solutions in which the plant roots are in contact with the solution containing the metals. Another hydroponic system is a solid support in which commercially available inert supports, such as for example, rock wool, are saturated with a metal-containing solution. The metal containing solution is periodically moved through the inert support that anchors the plants. Another hydroponic method involves growing plants in a column through which solution moves at regular intervals so that the roots never have a chance to dry out. This technique of moving the metal-containing solution over the roots will be referred to as a "flow-through" system. A further method involves incubating the roots in the metal-containing solution, which is continuously drained and refilled. This method provides for good root aeration and will be referred to hereinafter as an "intermittent" flow method. Another method is the so-called "aeroponic" method which involves contacting the developing roots with the metal-containing solution using ultrasound or compressed air to provide an aqueous mist or aerosol as the solution. Production of a mist or aerosol using ultrasound or compressed air are both well-known procedures exemplified by U.S. Pat. No. 5,017,351 (Rafson).

The preferred method includes contacting a metal-containing aqueous solution with the root biomass of a terrestrial plant by moving the solution through a column containing the root biomass. The column is preferably rendered opaque so that the roots are in darkness. The column can, however, be in a variety of configurations, not intended to limit the scope of the invention. For example, the column can be substantially horizontal so that the depth of the solution in the column is substantially less than the length of the column. This typically includes construction of elongated troughs which contain the root biomass. Alternately, the column can be oriented in a vertical position in which the depth of the solution is equal to or greater than the column width. In this configuration, the solution can flow vertically within the column. So long as the aqueous solution is in contact with the root biomass for a time sufficient for the roots to convert the metal from a soluble form into an insoluble form, the exact configuration of the column is of little significance. After uptake and/or precipitation is completed, the roots are then separated from the solution.

One configuration of a column 10 is shown in FIG. 1. The column 10 includes hydroponic treatment bed 12 for holding one or more plants in solution 14. The column 10 is preferably of an inert material such as polyvinylchloride, polytetrafluoroethylene (i.e. Teflon), or glass. The solution 14 has an air/aqueous interface 16. Disposed adjacent to this interface 16 is a mesh material 18 which can be made of an inert substance such as stainless steel, plastic or Teflon. In the embodiment illustrated, mesh 18 rests on a lip 19 formed on an inner surface 21 of column 10. On top of mesh 18 is a porous material 20 such as cheesecloth or thin, porous foam pad. On top of porous material 20 is a layer of soil 22 suitable for growing a particular terrestrial plant 24. In the embodiment illustrated, the soil 22 is a layer of a medium for supporting plant growth such as, for example, magnesium-aluminate-iron silicate (Vermiculite) in which the terrestrial plant seeds can be germinated. Alternately, if whole plants are to be used directly, the shoot 26 of the whole plant 24 is anchored by way of the mesh 18, as illustrated. The plants may also be supported by a wire cage (not shown). The metal-containing solution 14 may be aerated using, for example, an airstone 28 of an aquarium pump (not shown) or any other aeration system. The metal-containing solution 14 can be periodically removed from the column 10. Solution samples may be removed and the total solution volume adjusted through the sampling robe 30. The column can itself be supported by a support element 32. In FIG. 1, an outer surface 34 of the column 10 is engaged with an inner surface 36 of support element 32.

In the embodiment illustrated, the column is about 11.4 centimeters in diameter and about 9 centimeters deep. The depth of the metal-containing solution is about 4–5 centimeters. The thickness of the metal mesh can be up to several millimeters, covered by an approximately 2 centimeter deep layer of Vermiculite in which the seeds are already germinated, or the seedlings are transplanted, as in FIG. 1. The height of the support element is approximately the same as the solution depth, about 4–5 centimeters and the diameter (D) of support element 32 is slightly larger than the diameter (D') of column 10. In FIG. 1, the element is about 12 centimeters in diameter. The exact dimensions of the column and hydroponic treatment bed described herein are not intended to limit the scope of the invention since those having an ordinary skill in the art can easily devise other constructions that can accommodate more plants and a greater liquid volumes.

Figure 2:
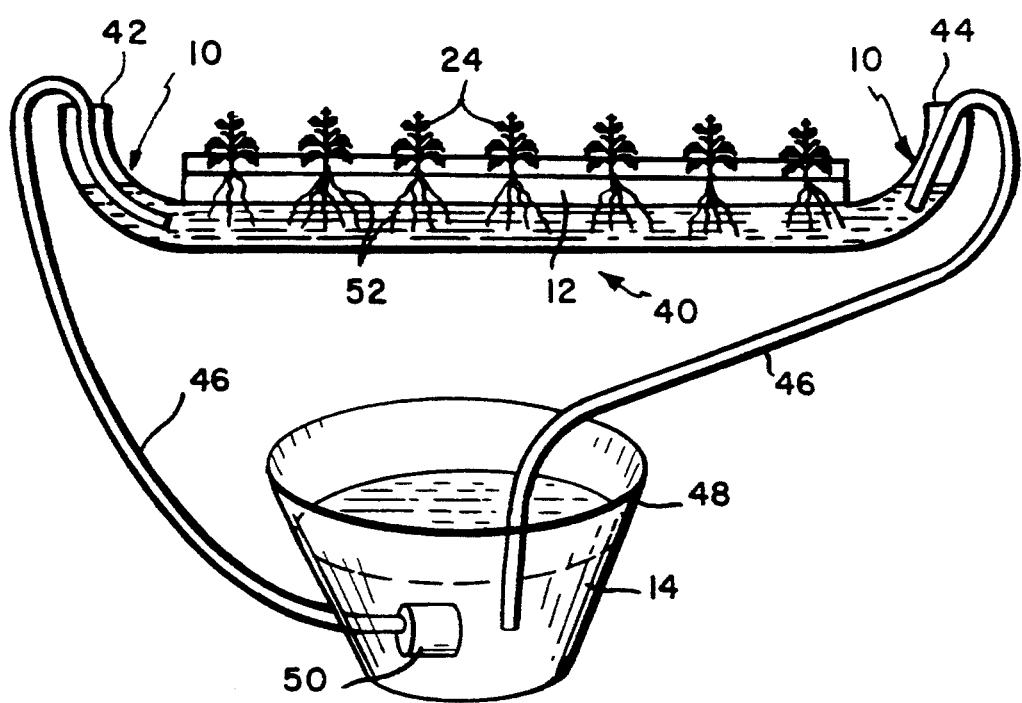
FIG. 2 is a schematic, cross-sectional illustration of another embodiment of the hydroponic column of the invention.

One example of such an expanded system is illustrated in FIG. 2. The hydroponic column 10 is a substantially elongated rectangular channel 40 having the length of about 85 centimeters, and a depth and width of about 7 centimeters. The total internal volume of metal-containing solution 14 in the column is about 7 liters.: The column has two opposed ends 42, 44. Each end 42, 44 is connected by way of a conduit 46 to a reservoir 48 containing the metal-containing solution 14. The total volume of reservoir 48 is greater than 7 liters. In FIG. 2, the reservoir volume is 10 liters.

A recirculation pump 50 is disposed within the solution 14 of reservoir 48 and is in fluid communication with one of the conduits 46. The roots 52 of the terrestrial plants 24 are maintained hydroponically within the column using, for example, the mesh and Vermiculite treatment bed system 12 described previously with reference to FIG. 1. In use, the solution is maintained in a constant flow over the roots 52. Alternately, the flow can be stopped and the roots allowed to take up and/or precipitate the metal under static (i.e., no flow) conditions. The roots are then separated from the solution.

It will be appreciated that a variety of other hydroponic systems can be employed using the columns of the present invention. For example, a series of columns containing hydroponic beds can be aligned in series or they can be aligned in a parallel. Moreover, the solution can flow continuously through the columns containing the hydroponic treatment beds. Further, the flow can be intermittent so that the solution within a given bed is static. Regardless of the type of flow or column configuration, after a certain time sufficient for the plants to convert the soluble metal to insoluble metal, the solution can be removed and the roots separated therefrom. Other methods, besides pumps, may be used to move the solution through the column(s). Solution can be, for example, gravity-fed to the column(s).

Figure 3:
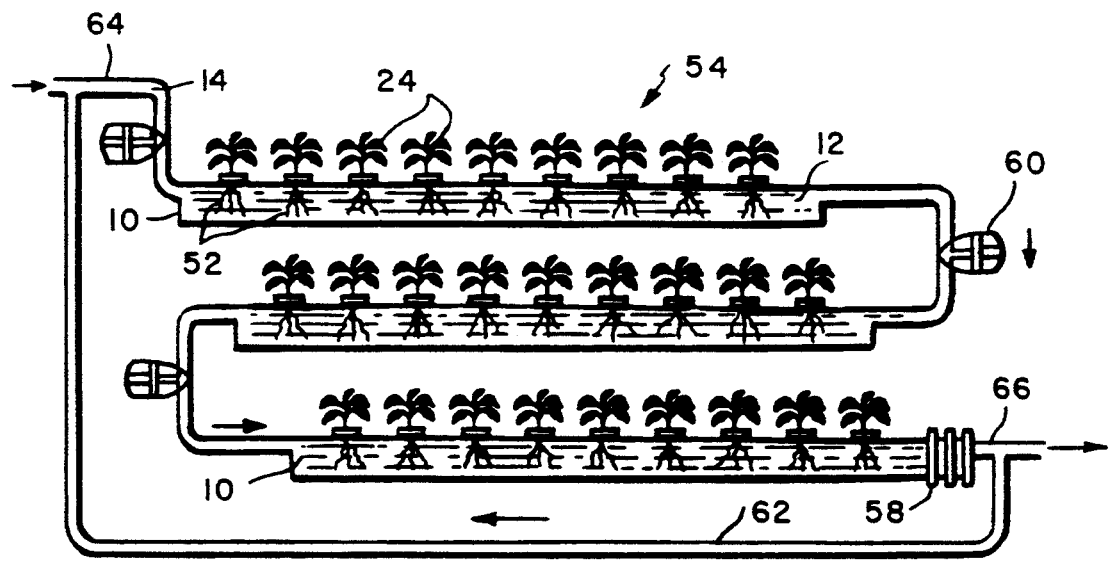
FIG. 3 is a schematic, cross-sectional illustration of a flow-through embodiment of the invention.
Figure 4:
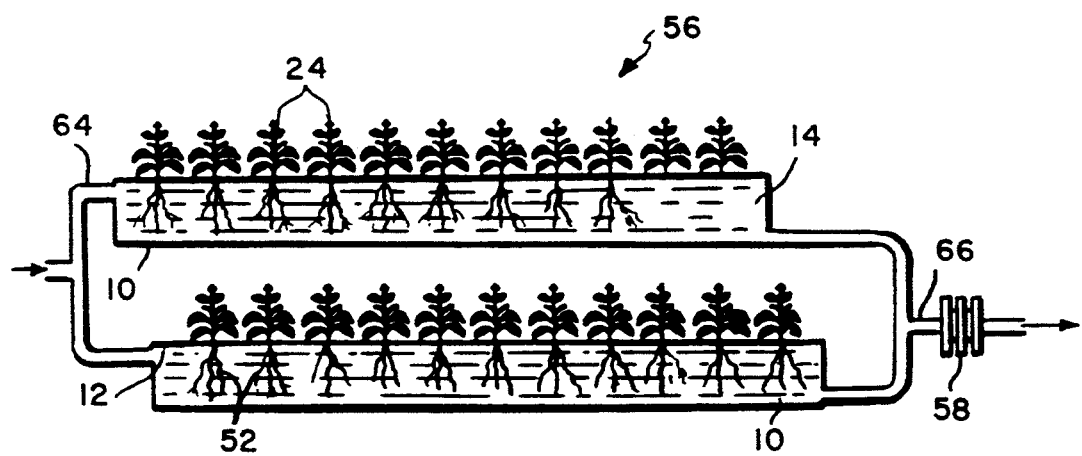
FIG. 4 is a schematic, cross-sectional illustration of an intermittent flow embodiment of the invention.

A schematic illustration of a flow-through system 54 is illustrated in FIG. 3. A plurality of columns 10 are connected in series and the solution 14 is pumped through the column by one or more pumps 60. A conduit 62 is in fluid communication with a solution inlet conduit 64 and with a solution exit conduit 66. Conduit 62 serves as a recirculation loop for solution flow. A schematic illustration of an intermittent flow system 56 is illustrated in FIG. 4. A plurality of columns 10 is arranged in series to a solution inlet conduit 64 and to a common exit conduit 66. The flow can conveniently be stopped to provide static conditions within the columns. After uptake and/or precipitation, flow is again started. Illustrated in FIGS. 3 and 4 is a filtration block 58 placed at a downstream end 44 of the flow-through column and placed at the common exit conduit of the intermittent flow system. Filtration block 58 can contain one or more falters (not shown) for separating the precipitated, insoluble metal from the solution 14. The type of membrane used to separate the precipitated metal can be one of a variety of commercially available filters such as, for example, those manufactured by Millipore Company, Bedford, Mass., and Whatman International Ltd., Maidstone, England.

There are several ways to prepare plants or their roots for removal of metals using the present methods. The simplest method is to grow plants hydroponically within the columns described herein, the columns being filled with nutrient solution. Growth is continued until the roots reach the appropriate size. At this point, the roots are exposed to the solution containing metal. Alternatively, the plants can be grown separately in a "nursery" (either hydroponically or in solid growth medium) and then transferred to the hydroponic treatment beds when the roots reach the appropriate size.

Applicants have discovered that excised roots of sunflowers and some Brassicaceae members may be even more effective than whole plants in removing metals from solutions. To perform the methods using excised roots, roots are simply cut off from hydroponically cultivated plants and immersed in a metal-containing solution. That is, a column such as those illustrated herein can be filled with excised roots and the metal-containing solution allowed to contact the roots, in a manner: similar to that described previously. This particular use of excised roots has been shown to be extremely effective (see Example 4).

The invention will now be illustrated by the following Examples.

EXAMPLE 1

Screening of Terrestrial Plants for Accumulation and Precipitation of Metals

This Example illustrates removal of lead from a solution by the roots of various cool and warm season turfgrasses and other plants selected for the use in the present method. Seed-grown plants or grass sod are cultivated hydroponically with roots growing in nutrient solution complemented with 0.6 g/L $Ca(NO_3)_2$. The nutrient solution is preferably 1 g/L Hydrosol ™. This solution consists of the following components:

Step 1: Dissolve 0.97 g of this material in 1 liter to obtain the following concentrations:

| Elemental Composition | Total | ppm |
|---|---|---|
| Nitrogen (all Nitrate) | NO3— | 50.0 |
| Phosphorus | P | 48.0 |
| Potassium | K | 210.0 |
| Magnesium | Mg | 30.0 |
| Sulfate | SO4 | 117.0 |
| Iron | Fe | 3.0 |
| Manganese | Mn | 0.50 |
| Zinc | Zn | 0.15 |

-continued

| | | |
|---|---|---|
| Copper | Cu | 0.15 |
| Boron | B | 0.50 |
| Molybdenum | Mo | 0.10 |

Step 2: Add 0.644 g/L of calcium nitrate to the solution.
Total nutrient concentration will be:

| | |
|---|---|
| Nitrogen as N: | 150 ppm N |
| Calcium as Ca: | 129 ppm Ca |

Hydroponic cultivation is performed in a system similar to that shown in FIG. 2 except that a relatively small amount of root tissue is used. After 2 to 4 weeks, the nutrient solution is substituted with a continuously aerated solution of Pb(NO$_3$)$_2$ containing 275 mg/L of lead as lead ion. The total volume of the solution is kept at 400 ml by the addition of distilled water to compensate for water lost through plant transpiration and evaporation. Lead accumulated in the plant tissue and lead remaining in the solution is measured after 3 days. The difference between lead decrease in the solution and lead uptake by roots represents the amount of lead precipitated by root exudate. (See Table 1, below.) Filter paper controls (thin strips of filter paper, 0.4 g DW (dry weight), immersed in the aerated lead solution) are used to demonstrate that lead uptake and precipitation is root specific. Similar results were obtained in a larger (7 L total volume) flow-through system shown in FIG. 2.

TABLE 1

| Species, 'Cultivar' (Scientific Name) | Season | Cultivation method | Disappearance from the solution (mg Pb/gm DW roots ± SE) | Pb in roots (mg/gm DW root ± SE) |
|---|---|---|---|---|
| Colonial bentgrass, 'Exeter' (*Agrostis tenuis* Sibth.) | Cool | Seed | 675 ± 200 | 169 ± 11 |
| Kentucky bluegrass, 'Liberty' (*Poa pratensis* L.) | Cool | Seed | 545 ± 12 | 165 ± 16 |
| Perennial ryegrass, 'Brazil II' (*Lolium perenne* L.) | Cool | Seed | 543 ± 34 | 134 ± 3 |
| Creeping bentgrass, 'Putter' (*Agrostis palustris* Huds.) | Cool | Seed | 485 ± 99 | 146 ± 30 |
| Chewing Fescue, 'Jamestown' (*Festuca rubra* var. *commutata* Gaud.) | Cool | Sod | 388 ± 277 | 27 ± 9 |
| Sheep fescue, 'Bighorn' (*Festuca ovina* L.) | Cool | Seed | 352 ± 59 | 111 ± 11 |
| Weeping lovegrass (*Eragrostis curvula* (Schrad.)) Nees | Cool | Seed | 289 ± 82 | 142 ± 12 |
| Hard fescue, 'Reliant' (*Festuca ovina* L. var. *duriscula* (L.) Koch.) | Cool | Sod | 258 ± 37 | 102 ± 9 |
| Tall fescue, 'Rebel' (*Festuca arundinacea* Schreb.) | Cool | Seed | 243 ± 72 | 85 ± 3 |
| Kentucky bluegrass, 'Baron' | Cool | Sod | 238 ± 31 | 69 ± 7 |
| Hard fescue, 'Crystal' | Cool | Seed | 231 ± 10 | 125 ± 7 |
| Creeping red fescue, 'Pennlawn' (*Festuca rubra* L. var. *genuina*) | Cool | Seed | 214 ± 23 | 86 ± 4 |
| Perennial ryegrass 'Cosmos' | Cool | Sod | 157 ± 35 | 80 ± 9 |
| Bermudagrass 'Sahara' (*Cynodon dactylon* (L.) Pers.) | Warm | Seed | 507 ± 117 | 90 ± 7 |
| Buffalograss, 'Texoka' (*Buchloe dactyloides* (Nutt.) Engelm.) | Warm | Seed | 393 ± 133 | 56 ± 4 |
| Centipedegrass (*Eremochloe ophiuroides* (Munro) Hack) | Warm | Seed | 385 ± 82 | 124 ± 13 |
| Switchgrass 'Blackwell' (*Panicum virgatum* L.) | Warm | Seed | 342 ± 109 | 116 ± 5 |
| Japanese lawngrass (JM-107) (*Zoysia japonica* Steud.) | Warm | Seed | 162 ± 25 | 56 ± 2 |
| Coastal panicgrass 'Atlantic' (*Panicum amarum* var. *amoralum* (Hitch & Chase)) | Warm | Seed | 148 ± 27 | 109 ± 9 |
| Wild cabbage (*Brassica oleracea*) | | Seed | 659 ± 205 | 134 ± 15 |
| Spinach (*Spinacia oleracea* L.) | | Seed | 626 ± 309 | 95 ± 25 |
| Sunflower (*Helianthus annuus* L.) | | Seed | 478 ± 87 | 140 ± 5 |
| Sorghum (*Sorghum bicolor* (L.) Moench) | | Seed | 234 ± 88 | 88 ± 7 |
| Tobacco (*Nicotiana tabacum* L.) | | Seed | 214 ± 41 | 132 ± 6 |
| Indian mustard, (*Brassica juncea* (L.) Czern.) | | Seed | 177 ± 38 | 103 ± 7 |
| Corn (*Zea mays* L.) | | Seed | 90 ± 25 | 75 ± 13 |
| Filter paper control | N/A | N/A | 15 ± 4 | 2 ± 0 |

EXAMPLE 2

EMS Mutagenesis

This example illustrates a protocol for use in mutagenizing plant members of the family Brassicaceae.

1. Dry seeds are placed in about 100 ml of a 0.3% (v/v) solution of EMS (obtained from Sigma chemicals, St. Louis, Mo.). There may be some variation from batch to batch of EMS so it may be necessary to adjust this concentration somewhat. Between 20,000 to 250,000 seeds are mutagenized at a time. Ethyl methane sulfonate (EMS) is a volatile mutagen. It should be handled only in a fume hood and all solutions and materials which it contacts should be properly disposed of.

2. Seeds are mixed occasionally or stirred on a stir plate and left at room temperature for 16–20 hours. The rate of mutagensis may be temperature-dependent so using a magnetic stir plate may alter the results by warming the solution.

3. Seeds are washed with distilled water 10 to 15 times over the course of 2 to 3 hours by decanting the solution, adding fresh water, mixing, allowing the seeds to settle, and decanting again. After about 8 washes the seeds are transferred to a new container and the original is disposed of.

4. After washing, the seeds are immediately sown at about 3 seeds per square cm (3000 seeds in 50 ml of 0.1% agar per 35×28×9 cm flat).

5. After several weeks it is useful to estimate the number of seeds which have germinated in order to know the size of the M1 generation. About 75% of the mutagenized seeds usually germinate. Ideally, the M1 estimate is the number of plants which produce M2 seed, but this is much more difficult to measure.

6. Plants are grown until they begin to die naturally and are then allowed to dry completely before harvesting. Complete drying improves the yield and simplifies harvesting.

EXAMPLE 3

Kinetics of Metal Removal

Figure 5A:
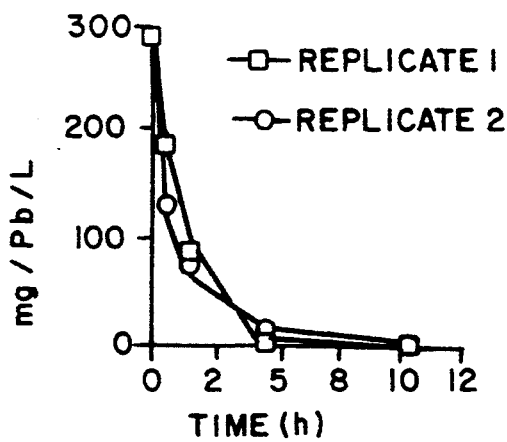
FIG. 5A is a graph illustrating the time course of lead removal by two replicate whole sunflower plants (□, ○)
Figure 6:
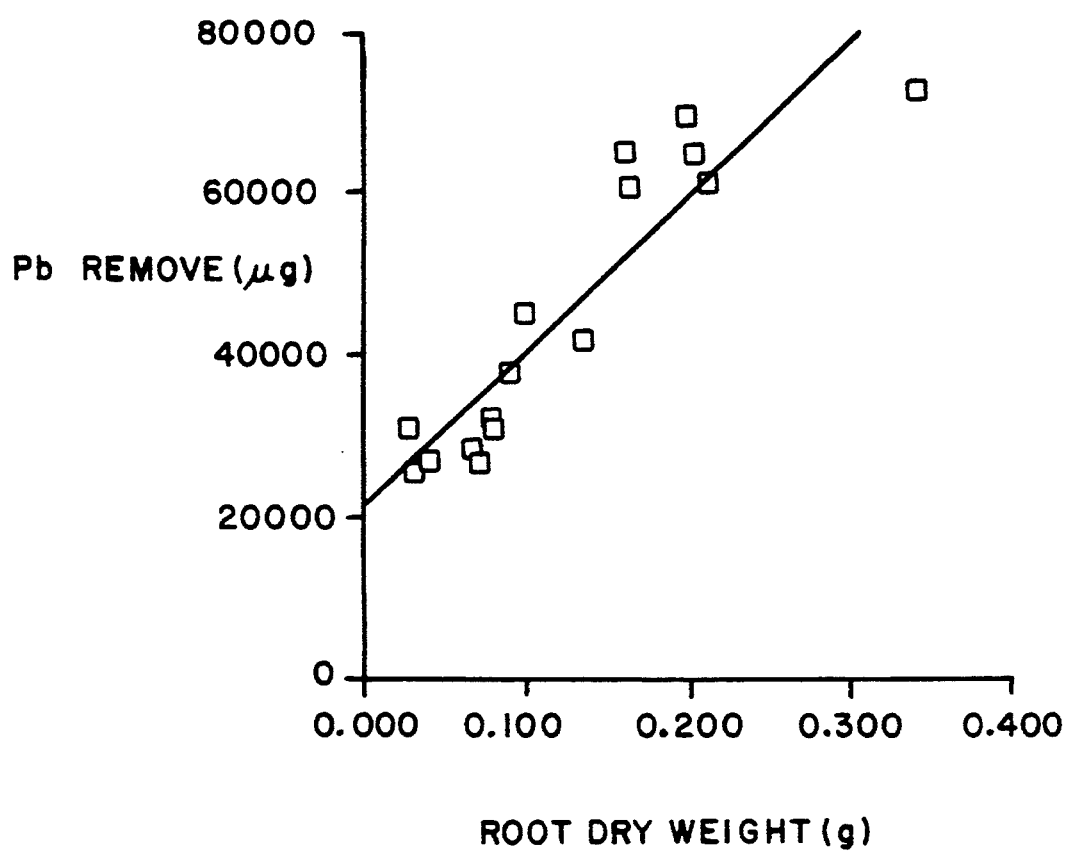
FIG. 6 is a graph illustrating the positive linear correlation between lead removal and sunflower root biomass; $y = 194325.3x + 20845.3$ ($r = 0.91$)

To determine the kinetics of lead removal, the roots of 7-week-old intact sunflower plants are incubated in a miniaturized system similar to that shown in FIG. 1 (total volume 400 ml). Within 4.5 hours, roots of the intact sunflower plants removed more than 90% of 275 mg $Pb^{+2}$/L initially present in the solution (FIG. 5A). Total fresh root mass of plant 1 was 33.2 g (2.1 g dry weight) and of plant 2 was 30.7 g (2.3 g dry weight). Furthermore, the rate of lead removal is significantly correlated ($r=0.83$) with the root dry biomass used in the experiment (FIG. 6).

Other metal ions (e.g. $Ca^{+2}$, $Co^{+2}$, $Cu^{+2}$, and $K^{+1}$) did not significantly interfere with the ability of rhizofiltrating plants to accumulate lead ion. This suggests that the present methods can be used to remove lead from complex aqueous mixtures containing different ions.

EXAMPLE 4

Metal Accumulation By Excised Roots

Figure 5B:
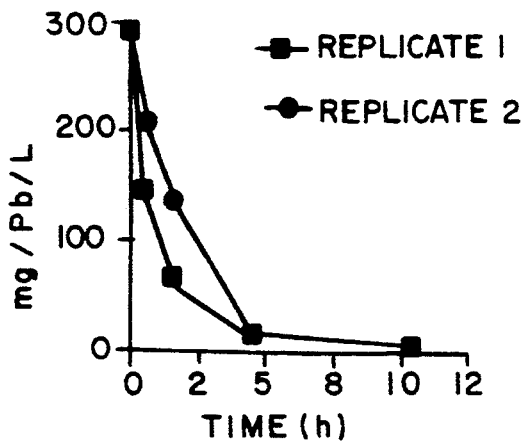
FIG. 5B is a graph illustrating the time course of lead removal by two replicate excised sunflower roots (■,●)

Roots are excised from hydroponically cultivated terrestrial plants and the excised roots immersed in a column containing a solution with lead ions (400 ml total volume with $Pb^{+2}$ concentration between 275–285 mg/L). The time course of lead removal by the roots connected to the plant is also compared with uptake by excised roots alone. FIG. 5 also illustrates the comparison of kinetics of lead uptake between the roots of the intact sunflower plants (FIG. 5A) and excised sunflower roots (FIG. 5B) (total fresh root biomass for excised roots was 12.1–15.7 g (0.8–1.0 g dry weight).

Figure 7:
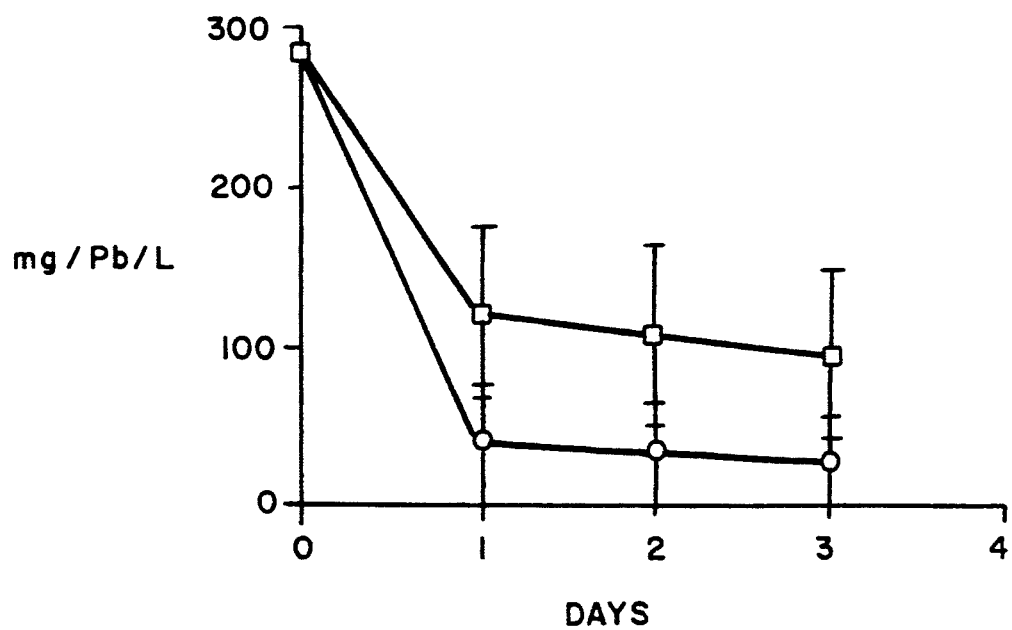
FIG. 7 is a graph illustrating the time course of lead removal by *B. juncea* excised roots (○) and *B. juncea* whole plants (□).

FIG. 7 shows kinetics of lead uptake for whole *B. juncea* plants (□) and excised *B. juncea* root (o). The average fresh root mass for the whole plant was 3.3±0.3 g (0.3±0.1 g dry weight; n=4). The average fresh root mass for the excised roots alone was 3.7±1.0 g (0.3±0.1 g dry weight; n=4).

EXAMPLE 5

Chemical Analysis of Precipitate

Lead-treated roots of bermudagrass, *B. juncea* and sunflower were subjected to scanning electron microscopy with a Jeol 35 C SEM operating at 15 kV acceleration. Imaging was done in both secondary electron mode and back scattered electron mode to visualize the sites of lead deposition in the root tissue. The initial results suggest that most of the lead ion accumulates in the extracellular spaces of the epidermal layer in the form of a mixture of lead carbonate, some lead phosphate and, possibly, lead oxide.

Lead removal in the present method is caused by both metal accumulation in plant roots and by the ability of roots of living plants to precipitate lead ions from the solution. The precipitated lead gives a distinctly milky appearance to the solution surrounding the roots. Chemical analysis of the root precipitate collected from the system was performed by infrared spectroscopy and direct current plasma spectrometry and the precipitate was identified as lead phosphate $Pb_3(PO_4)_2$. The chemical structure of the precipitate did not vary when different species were used in the system. These results may indicate that phosphate exudation functions as a defense mechanism elicited in grass roots by lead and possibly other metals. The function of this defense mechanism may be to precipitate lead before it has a chance to come in contact with living root tissues.

EXAMPLE 6

Vector Construction and Transformation of *B. juncea* with MT Genes

A. Vector Construction

Monkey MT cDNAs (MT1 & MT2) are obtained form Dr. Dean H. Hamer, National Institutes of Health, Bethesda, Md. A 341 bp Hind III/Bam HI fragment containing the entire MT1 coding sequence including the initiator methionine codon is cloned into the Hind III/Bgl II site of pJB90 to give plasmid pNK1. pJB90 (obtained form Dr. Deepak Pental, Tata Energy Research Institute, New Delhi, India) is an Agrobacterium-based binary, plant transformation/expression, vector. This plasmid contains a plant selectable hpt (hygromycin phosphotransferase) gene and a multiple cloning site for the insertion of foreign DNA, between the T-DNA border repeats. The plasmid also contains a gene for spectinomycin resistance, functional in bacterial cells. pNK1 propagated in *E. coli* Dh5 was used to transform *Agrobacterium tumefaciens* strain pGV2260 (Deblaere et at., *Nucl. Acids. Res.*, 13: 4777, 1985) by the freeze-thaw method (Ebert et at., *PNAS, U.S.A.*, 84: 5745, 1987).

B. Transformation of *B. juncea*

*Agrobacterium tumefaciens* strain pGV2260 carrying pNK1 is grown overnight ((220 rpm, 28° C. in dark) in 5 mL of liquid YEB [beef extract-0.5%; yeast extract-0.1%; peptone-0.5%; sucrose-0.5%; $MgSO_4.7H_2O$-0.005%] containing 100 mg/L each of spectinomycin and rifampicin. One mL of this suspension is used to inoculate 50 mL of the YEB with the same concentrations of antibiotics and allowed to grow overnight. On the third day, the bacteria are harvested by centrifugation (5500 rpm) and resuspended in filter sterilized liquid MS (see Murashige, T., and Skoog, F., *Physiol. Plant* 15: 473–497, 1962) modified medium (MS salts & vitamins with 10 g/L each of sucrose, glucose and mannitol) supplemented with 200 micromolar acetosyringone and 100 mg/L each of spectinomycin and rifampicin at pH 5.6 The optical density of the bacterial suspension is adjusted to about $A_{600}=1.0$ and the bacteria grown for 6 hours, harvested as before are resuspended in the same medium. Freshly cut hypocotyl explants are incubated in the bacterial suspension for 1 h and co-cultivated on MS modified medium supplemented with 2 mg/L BAP (6-benzylaminopurine) and 0.1 mg/L NAA (naphthaleneacetic acid). After 2 days the explants are transferred to MS medium supplemented with 2 mg/L BAP, 0.1 mg/L 2,4-D (2-4 dichlorophenoxyacetic acid), 200 mg/L Cefotaxime and 30 micromolar $Ag(NO_3)_2$ and 10 mg/L Hygromycin B. After 10 days incubation on this medium, the explants are shifted to MS supplemented with 2 mg/L BAP, 0.1 mg/L NAA, 200 mg/L Cefotaxime, 10 mg/L Hygromycin B and 10% coconut milk. Shoots developed in 15-20 days are grown further and rooted in the presence of 20 mg/L hygromycin. We have obtained transformants with the line 173874 at a frequency of about 2%.

C. Characterization of MT gene expression in transgenic plant lines

About 15 independent transgenic plants are generated for the *B. juncea* line mentioned above. The putative transformants are analyzed for the presence of MT1 DNA by Southern and Northern hybridization analysis using MT1 cDNA as a probe. The putative transformants are analyzed for expression of MT1 protein by immunoblot analysis with antisera against monkey MT.

Transgenic lines expressing high MT levels are selected and tested for lead and chromium accumulation and metal tolerance in greenhouse trials described above. The transgenic lines are evaluated in large scale greenhouse trials which will utilize lead and chromium contaminated soil collected from the polluted sites.

Conclusions

Roots of the best plants identified in our screens contain about 15% by weight of lead in dry biomass (Table 1), which is the equivalent of 65% lead by weight in ash. This concentration makes reclaiming metals from ash a viable alternative to ash burial. By combining uptake and precipitation, the roots of the most efficient plants (i.e. sunflower) remove amounts of lead equal to 60% of their total dry weight. This is far beyond the capacity of all known ion exchange columns, which may be considered as an alternative to the present methods. In addition, our estimates suggest that the methods of the invention are an order of magnitude cheaper than ion exchange-based purification schemes.

Equivalents

Those skilled in the art will recognize, or will be able to ascertain using no more than routine experimentation, numerous equivalents to the specific products and processes described herein. Such equivalents are considered to be within the scope of the invention and are intended to be covered by the following claims.

We claim:

1. A method for reducing an amount of metal in a metal-containing solution, comprising:
    contacting the solution with a terrestrial plant having a root biomass, said contacting under conditions sufficient for the root biomass of the terrestrial plant to remove the metal from the solution;
    separating the root biomass of the terrestrial plant from remaining parts of the terrestrial plant; and
    removing the root biomass from the metal-containing solution.

2. The method of claim 1, wherein the step of contacting comprises contacting the solution with the root biomass by passing the solution through a column containing the root biomass.

3. The method of claim 1, wherein the step of contacting comprises contacting a plant under conditions sufficient to convert the metal from a soluble form to an insoluble form.

4. The method of claim 1, wherein the step of contacting the solution comprises contacting with a terrestrial plant that is selected from the group consisting of sunflower, turfgrasses and members of the Family Brassicaceae.

5. The method of claim 4, wherein the turfgrasses are selected from the group consisting of Colonial bentgrass, Kentucky bluegrass, perennial ryegrass, creeping bentgrass, fescues, lovegrass, Bermudagrass, Buffalograss, centipedegrass, switch grass, lawngrass and coastal panicgrass.

6. The method of claim 4, wherein the members of the Brassicaceae are selected from the group consisting of *Brassica juncea* and *B. Oleracea*.

7. The method of claim 1, wherein the step of contacting the solution with the root biomass comprises contacting under substantially constant flow conditions.

8. The method of claim 1, wherein the step of contacting the solution with the root biomass comprises connoting under intermittent flow conditions.

9. The method of claim 1, wherein the step of contacting comprises contacting the solution with the terrestrial plant that is disposed in a solid support.

10. The method of claim 1, wherein the step of contacting comprises contacting an aqueous mist or aerosol form of the solution with a root biomass of a terrestrial plant under conditions sufficient for the root biomass to remove the metal from the solution.

11. The method of claim 1, further comprising,
    allowing the remaining parts of the terrestrial plant to regrow new root biomass after said root biomass is removed from the metal-containing solution; and
    contacting the metal-containing solution with the terrestrial plant having the regrown root biomass under conditions sufficient for the regrown root biomass to remove the metal from the metal-containing solution.

12. A method of removing metal from a solution containing said metal, comprising:
    growing a terrestrial plant derived from a mutagenized progenitor hydroponically in the presence of the metal;
    allowing roots of the plant to remain in contact with the solution for a time and under conditions sufficient for the roots to accumulate metal therein.

13. The method of claim 12, wherein the step of allowing roots of the plant to remain in contact with the solution comprises allowing roots to promote precipitation of the metal from the solution.

14. The method of claim 13, further comprising separating the precipitated metal from the solution.

15. A method of removing a soluble metal from a solution, comprising:
    providing a column for holding at least one plant in a solution, the column having one and another ends;
    introducing a solution containing the soluble metal into one end of the column;

maintaining a terrestrial plant derived from a mutagenized progenitor hydroponically within the column;

allowing the plant to accumulate the metal in roots of the plant; and removing the solution from at least one of said ends of the column.

16. The method of claim 15, further comprising harvesting the roots after allowing accumulation of the metal therein.

17. The method of claim 16, wherein the step of harvesting occurs after the step of removing the solution.

18. The method of claim 15, wherein the step of maintaining a plant comprises maintaining a terrestrial plant that accumulates more metal in root biomass than in shoot biomass thereof.

19. The method of claims 15 or 18 further comprising allowing roots of the plant to precipitate metal out of the solution.

20. The method of claim 19, further comprising separating the precipitated metal from the solution at one end of the treatment bed.

21. The method of claim 15, wherein the column is opaque.

22. The method of claims 1, 12 or 15 wherein the metal is selected from the group consisting of lead, chromium, mercury, cadmium, cobalt, nickel, molybdenum, copper, arsenic, selenium, zinc, antimony, beryllium, gold, barium, manganese, silver, thallium, tin, rubidium, strontium, vanadium, yttrium, technecium, ruthenium, palladium, indium, cesium, uranium, plutonium, and cerium.

23. A method for reducing an amount of metal in a metal-containing solution, comprising:

contacting the solution with a root biomass of a terrestrial plant under conditions sufficient for the root biomass to remove the metal from the solution; and separating the root biomass from the solution, wherein the terrestrial plant is derived from a mutagenized progenitor.

24. The method of claim 23, wherein the terrestrial plant is derived from a progenitor mutagenized with EMS.

25. A method for reducing an amount of metal in a metal-containing solution, comprising:

contacting the solution with a root biomass of a terrestrial plant under conditions sufficient for the root biomass to remove the metal from the solution; and separating the root biomass from the solution, wherein the terrestrial plant is a transformant expressing a heterologous gene.

26. The method of claim 25, wherein the heterologous gene comprises a metallothionein structural gene.

27. A method of removing metal from a solution containing said metal, comprising:

hydroponically growing a terrestrial plant in the presence of the metal, the terrestrial plant being a transformant expressing a heterologous gene;

allowing roots of the plant to remain in contact with the solution for a time and under conditions sufficient for the roots to accumulate metal therein.

28. The method of claim 27, wherein the step of growing a transformant comprises growing a transformant containing a heterologous gene that comprises a metallothionein structural gene.

29. A method of removing a metal from a solution, comprising:

providing a column for holding at least one plant in a solution, the column having one and another ends;

introducing a solution containing the metal into one end of the column;

hydroponically maintaining within the column a terrestrial plant that is a transformant expressing a heterologous gene;

allowing the plant to accumulate the metal in roots of the plant; and removing the solution from at least one of said ends of the column.

30. The method of claim 29, wherein the step of maintaining a transformant comprises maintaining a transformant containing a heterologous gene that comprises a metallothionein structural gene.

31. A method for reducing an amount of metal in a metal-containing solution, comprising:

contacting excised roots of a terrestrial plant with a metal-containing solution under conditions sufficient for the excised roots to remove the metal from the solution; and separating the excised roots from the solution.

32. The method of claim 31, further comprising, hydroponicaly growing the terrestrial plant and excising the roots thereof prior to contacting the excised roots with the metal-containing solution.

33. A method for reducing an amount of metal in a metal-containing solution, comprising:

selecting a terrestrial plant that accumulates more metal in root biomass than in shoot biomass;

contacting the solution with the root biomass of the terrestrial plant under conditions sufficient for the root biomass of the terrestrial plant to remove the metal from the solution; and separating the root biomass of the terrestrial plant from remaining parts of the terrestrial plant.

* * * * *

UNITED STATES PATENT AND TRADEMARK OFFICE
CERTIFICATE OF CORRECTION

PATENT NO. : 5,393,426
DATED : Feb. 28, 1995
INVENTOR(S) : Ilya Raskin, et al

It is certified that error appears in the above-indentified patent and that said Letters Patent is hereby corrected as shown below:

Column 14, line 30: please delete "connoting"; and insert therefor -- contacting --.

Signed and Sealed this

Twenty-fifth Day of April, 1995

Attest:

BRUCE LEHMAN

Attesting Officer      Commissioner of Patents and Trademarks